(12) United States Patent
Wu et al.

(10) Patent No.: US 7,191,824 B2
(45) Date of Patent: Mar. 20, 2007

(54) TUBULAR CHARGE AIR COOLER

(75) Inventors: Alan K. Wu, Kitchener (CA); Brian E. Cheadle, Bramalea (CA); Eric Luvisotto, Mississauga (CA)

(73) Assignee: Dana Canada Corporation (CA)

( * ) Notice: Subject to any disclaimer, the term of this patent is extended or adjusted under 35 U.S.C. 154(b) by 101 days.

(21) Appl. No.: 10/719,970

(22) Filed: Nov. 21, 2003

(65) Prior Publication Data

US 2005/0109493 A1    May 26, 2005

(51) Int. Cl.
F28F 9/22 (2006.01)
F28D 7/10 (2006.01)
F28D 7/16 (2006.01)

(52) U.S. Cl. .................... 165/141; 165/154; 165/161; 165/164

(58) Field of Classification Search ................ 165/140, 165/141, 154–156, 157, 159–160, 164, 109.1, 165/66, 916; 29/890.036
See application file for complete search history.

(56) References Cited

U.S. PATENT DOCUMENTS

| | | | |
|---|---|---|---|
| 2,081,678 A | | 5/1937 | Rosenblad |
| 2,662,749 A | * | 12/1953 | Buschow ................. 165/141 |
| 3,083,662 A | * | 4/1963 | Zeidler ..................... 72/324 |
| 3,323,586 A | | 6/1967 | Burne et al. |
| 3,412,787 A | | 11/1968 | Milligan |
| 3,468,371 A | * | 9/1969 | Menze ..................... 165/156 |
| 3,473,348 A | | 10/1969 | Bottum |
| 3,474,513 A | | 10/1969 | Allingham |
| 3,732,921 A | * | 5/1973 | Hilicki et al. ............. 165/154 |
| 3,828,851 A | * | 8/1974 | Takayasu .................. 165/165 |
| 3,887,004 A | | 6/1975 | Beck |
| 3,960,207 A | | 6/1976 | Boer |
| 4,004,634 A | | 1/1977 | Habdas |
| 4,059,882 A | * | 11/1977 | Wunder ................. 29/890.036 |
| 4,096,616 A | | 6/1978 | Coffinberry |
| 4,146,088 A | | 3/1979 | Pain |
| 4,257,480 A | | 3/1981 | Winkleblack |
| 4,340,501 A | | 7/1982 | Davidson |
| 4,448,243 A | | 5/1984 | Pain |
| 4,598,768 A | | 7/1986 | Tenne |
| 4,893,670 A | | 1/1990 | Joshi et al. |

(Continued)

FOREIGN PATENT DOCUMENTS

CA    1026316    2/1978

(Continued)

*Primary Examiner*—Tho Duong
(74) *Attorney, Agent, or Firm*—Dykema Gossett PLLC

(57) ABSTRACT

A core for a charge air cooler comprises inner and outer concentric tubes providing an axially extending annular passageway for flow of a fluid, preferably a liquid coolant. A first inlet and a first outlet are provided at the ends of the axial annular passageway. Arranged on an outer surface of the outer tube is at least one circumferential fluid flow passageway for flow of a fluid, preferably air. Each circumferential flow passageway is provided with a corrugated strip fin comprising a plurality of rows of corrugations. The core is combined with an outer housing to form a heat exchanger. The housing is provided with an inlet and an outlet for the fluid flowing through the circumferential flow passageways. Other embodiments are disclosed in which the heat exchanger is adapted for use with three fluids and in which additional cooling capacity is provided by the provision of coolant passageways in the housing.

31 Claims, 8 Drawing Sheets

U.S. PATENT DOCUMENTS

| | | | |
|---|---|---|---|
| 4,964,459 A * | 10/1990 | Stenlund | 165/119 |
| 4,995,454 A | 2/1991 | Thompson | |
| 5,143,151 A | 9/1992 | Pain | |
| 5,558,069 A * | 9/1996 | Stay | 123/541 |
| 5,732,769 A * | 3/1998 | Staffa | 165/154 |
| RE35,890 E | 9/1998 | So et al. | |
| 6,019,168 A | 2/2000 | Kinnersly | |
| 6,199,626 B1 | 3/2001 | Wu et al. | |
| 6,244,334 B1 | 6/2001 | Wu et al. | |
| 6,273,183 B1 | 8/2001 | So et al. | |
| 6,340,053 B1 | 1/2002 | Wu et al. | |
| 6,585,034 B2 | 7/2003 | Oswald | |
| 2003/0133856 A1 | 7/2003 | Le | |

FOREIGN PATENT DOCUMENTS

JP    62169995 A    7/1987

* cited by examiner

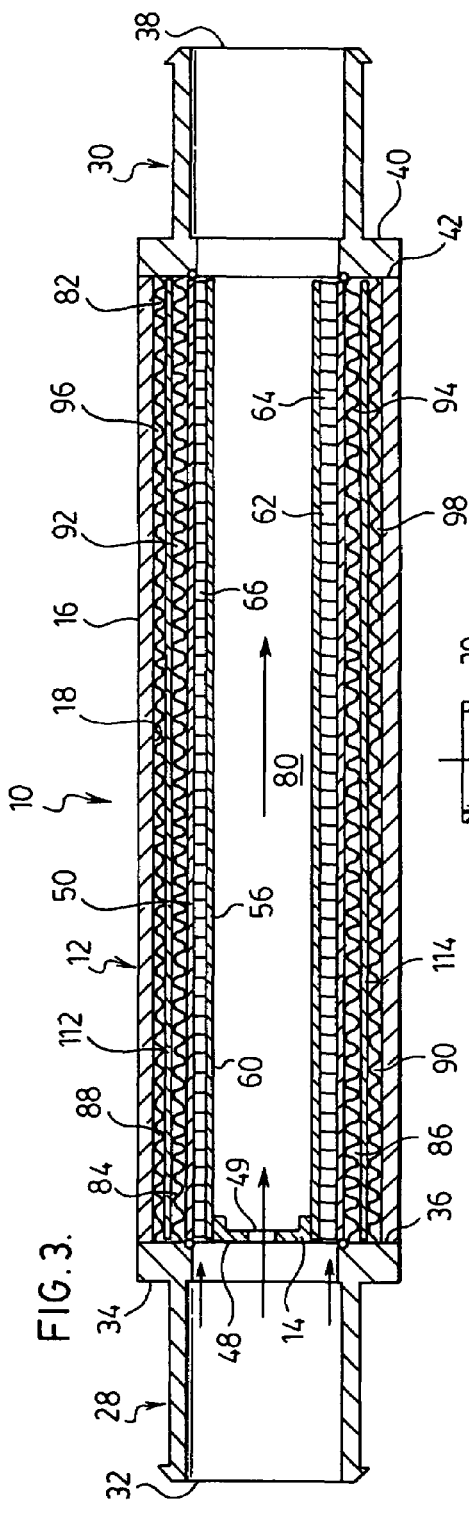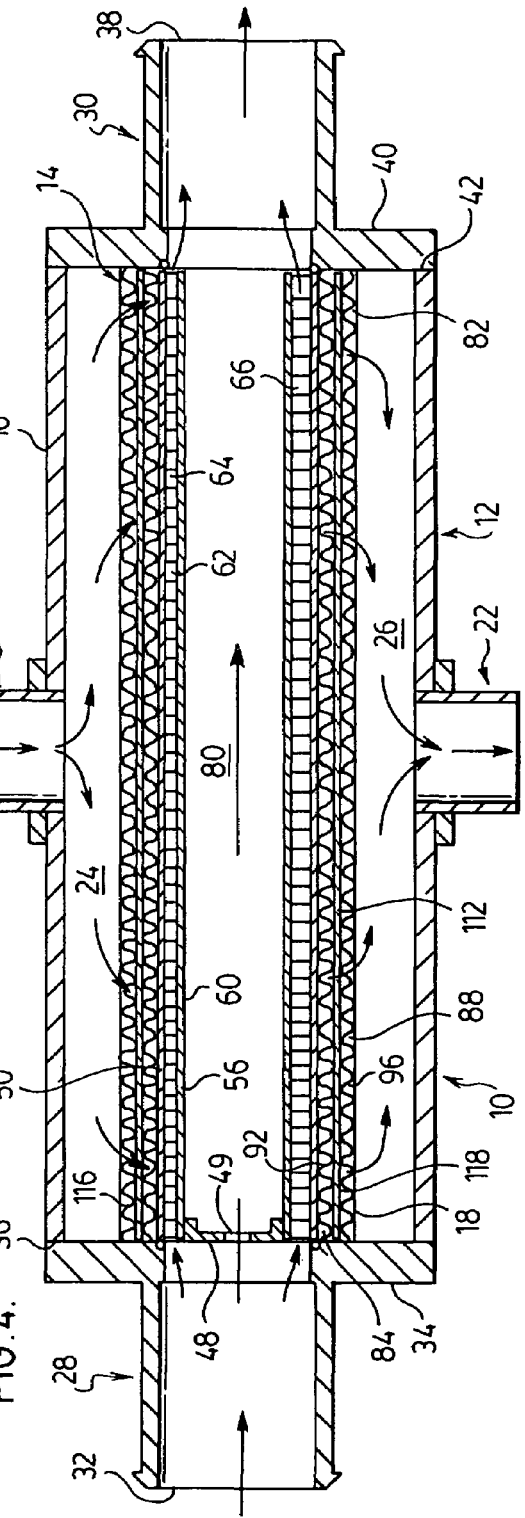

TUBULAR CHARGE AIR COOLER

FIELD OF THE INVENTION

The present invention relates to tubular heat exchangers for transferring heat from one fluid to another, and particularly to charge air coolers having a tubular core.

BACKGROUND OF THE INVENTION

Tubular heat exchangers are known for a variety of applications. The prior art contains several examples of tubular heat exchangers in which a tube is provided with inner and outer heat exchange surfaces which may be ribbed or corrugated to enhance heat transfer. Such corrugated or ribbed tubes may be formed by extrusion of relatively complex shapes. For example, U.S. Pat. No. 3,887,004 (Beck) describes a concentric tube heat exchanger having an outer tubular shell and an inner splined tube which is preferably formed by extrusion. As shown in FIG. 8 of Beck, a finned structure may preferably be provided inside the splined tube.

It has also been proposed to construct a tubular charge air cooler comprising an extruded aluminum member with two concentric layers spaced by radial splines to provide a flow passage for a first fluid. The second fluid flows through machined grooves formed on the outer surface of the tube.

There exists a need for a simplified, lightweight structure of tubular heat exchangers which avoids use of complex extruded and machined components.

SUMMARY OF THE INVENTION

The present invention provides a heat exchanger comprising an outer tube having an outer surface and an inner tube received inside the outer tube and concentric therewith. An axial fluid flow passageway is formed between the inner and outer tubes. The heat exchanger further comprises a first inlet and a first outlet in fluid communication with the axial passageway, the first inlet and the first outlet being axially spaced from one another. At least one circumferential fluid flow passageway is formed in the annular space between the housing and the outer tube. A corrugated strip fin is arranged in each of said at least one circumferential fluid flow passageways said strip fin comprising a plurality of rows of corrugations the corrugations comprising a top portion, a bottom portion and a side wall connecting the top and bottom portions, the bottom portions of at least some of the corrugations being in contact with the outer tube.

In another aspect, the present invention provides a heat exchanger core comprising an outer tube having an outer surface and an inner tube received inside the outer tube and concentric therewith. An axial fluid flow passageway is formed between the inner and outer tubes. The heat exchanger further comprises a first inlet and a first outlet in fluid communication with the axial passageway, the first inlet and the first outlet being axially spaced from one another. At least one circumferential fluid flow passageway is formed in the annular space between the housing and the outer tube. A corrugated strip fin is arranged in each of said at least one circumferential fluid flow passageways said strip fin comprising a plurality of rows of corrugations the corrugations comprising a top portion, a bottom portion and a side wall connecting the top and bottom portions, the bottom portions of at least some of the corrugations being in contact with the outer tube.

BRIEF DESCRIPTION OF THE DRAWINGS

The invention will now be described, by way of example only, with reference to the accompanying drawings, in which:

FIG. 3 is an axial cross section along line 3–3' of FIG. 1;

FIG. 4 is an axial cross section along line 4–4' of FIG. 1;

DETAILED DESCRIPTION OF PREFERRED EMBODIMENTS

Figure 1:
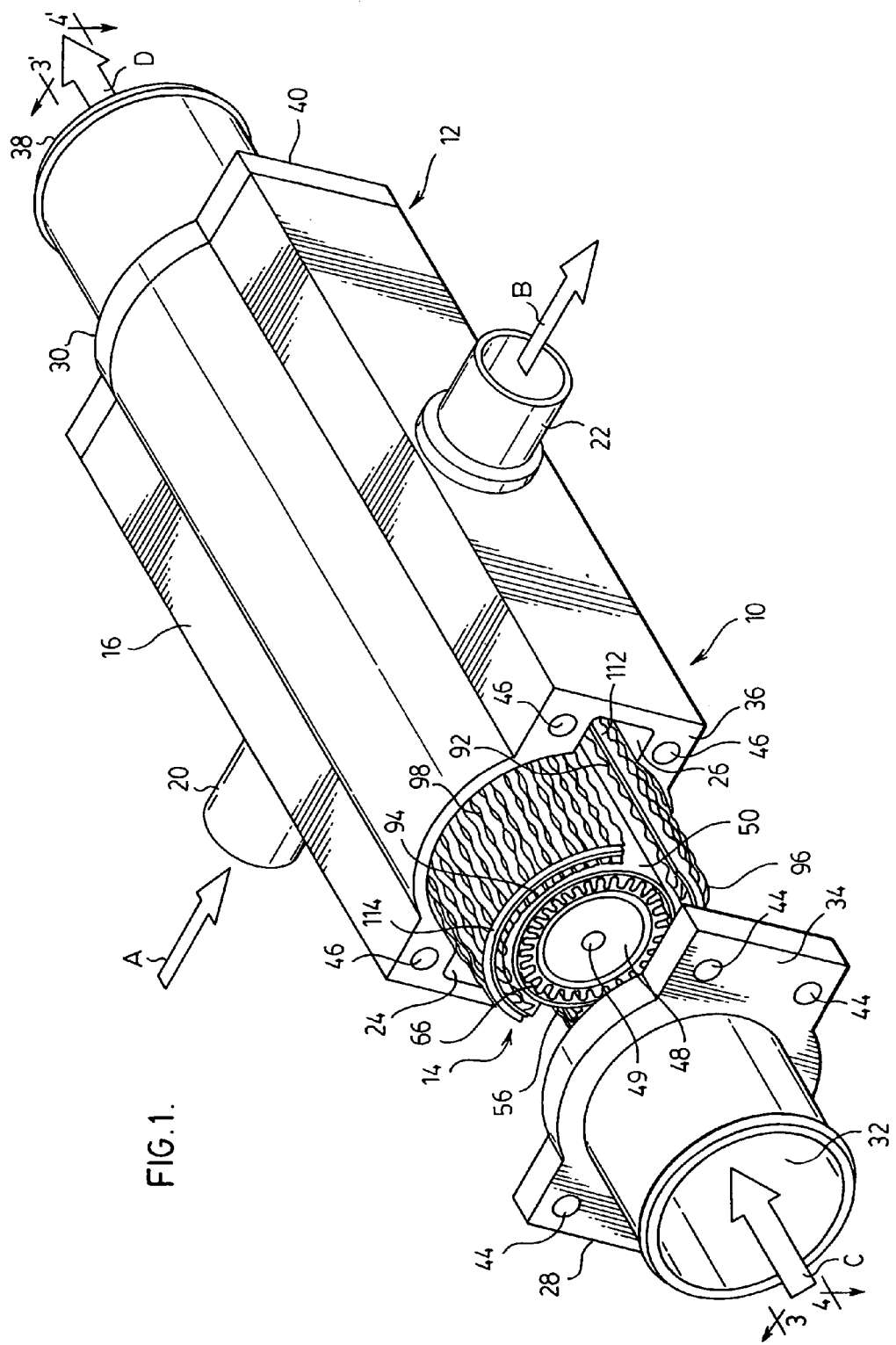
FIG. 1 is a perspective view of a preferred charge air cooler according to the invention, with one of the end fittings separated from the housing to expose the core.

Turning to the drawings, in which like components are designated by like reference numerals, a first preferred heat exchanger 10 is shown in FIGS. 1 to 5. The heat exchanger 10 comprises a housing 12 and a core 14. In the drawings, like components are designated by like reference numerals throughout the various figures. The heat exchanger 10 is preferably used as a charge air cooler in which air is cooled by a fluid, preferably a liquid coolant. The charge air cooler according to the invention may be preferably used in automotive or vehicular applications where turbo charging or super charging is used in conjunction with an internal combustion engine. Other applications for the charge air cooler of the invention include the air supply system of a fuel cell engine. It will, however, be appreciated that the heat exchanger may instead be used to heat air or to heat or cool a fluid other than air, and may be used in stationary as well as vehicular engine applications.

Figure 2:
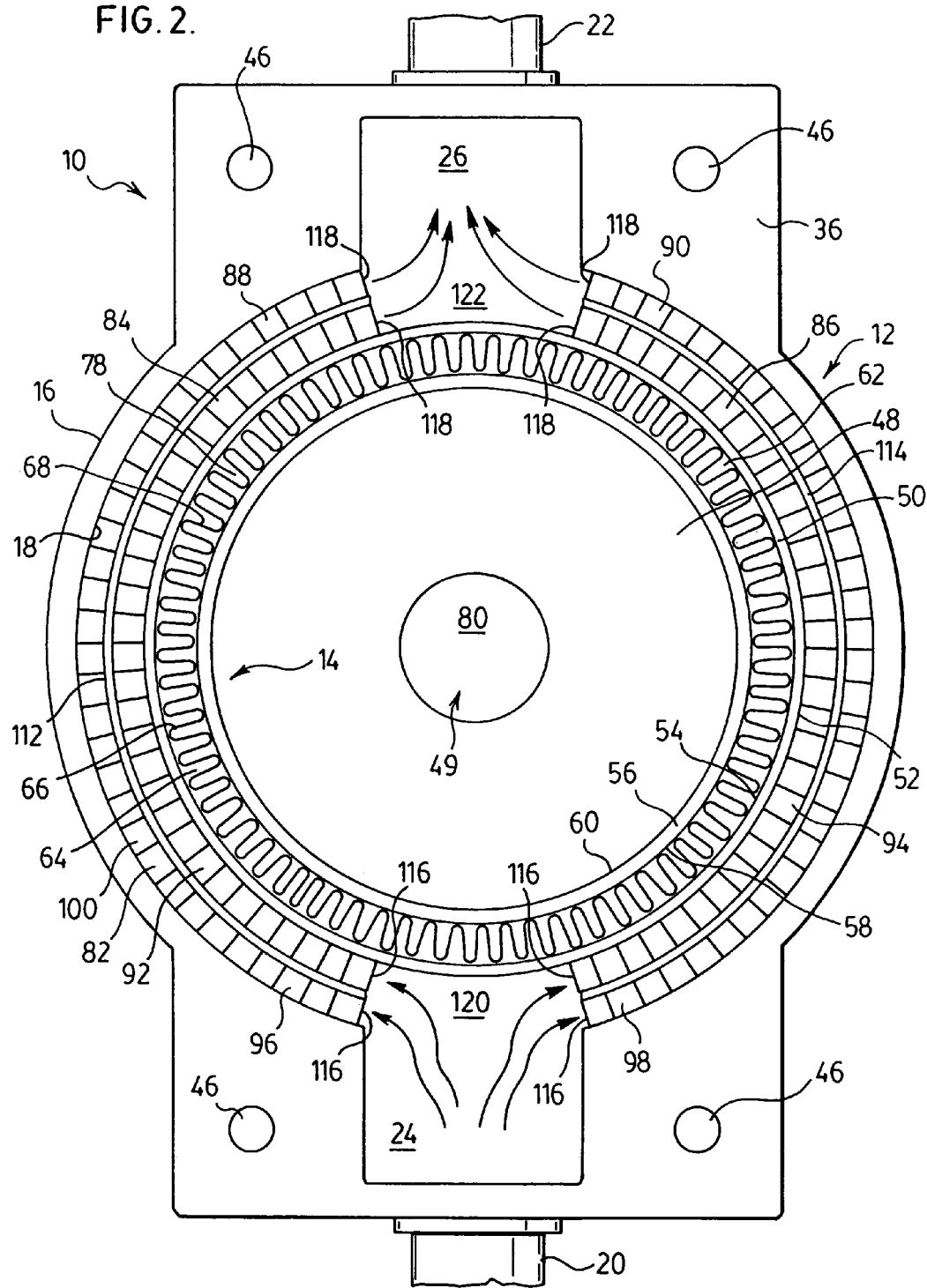
FIG. 2 is an end view of the charge air cooler of FIG. 1 with the end fitting removed.

The housing 12 comprises a side wall 16 having a generally cylindrical inner surface 18 (FIG. 2). The housing 12 further comprises an inlet 20 through which air or another fluid enters the heat exchanger 10 in the direction of arrow A and an outlet 22 through which this fluid leaves the heat exchanger 10 in the direction of arrow B. The inlet 20 and outlet 22 project from the housing 12 and are circumferentially spaced from one another. In the specific example shown in the drawings, the inlet 20 and outlet 22 are circumferentially spaced by about 180 degrees. It will be appreciated that the spacing of the inlet and outlet may vary depending on the configuration of the heat exchanger 10.

The inlet 20 communicates with the interior of housing 12 through an inlet manifold 24 which is in the form of an axially extending groove formed in the side wall 16. The inlet manifold 24 is illustrated in the drawings as comprising a groove of rectangular cross section. Outlet 22 communicates with the interior of housing 12 through a similarly shaped outlet manifold 26. Although manifolds 24, 26 are shown as being of rectangular shape, it will be appreciated that the manifolds 24, 26 may be of any suitable cross-sectional shape, for example semi-circular. Preferably, the manifolds 24 and 26 extend axially along the entire length of the housing 12 and are integrally formed with the housing 12. However, it will be appreciated that the manifolds 24, 26 may extend along only part of the length of housing 12.

The housing 12 further comprises a pair of end fittings 28, 30. End fitting 28 comprises an inlet opening 32 for axial flow of a second fluid in the direction of arrow C and an apertured connection flange 34 through which the end fitting 28 is secured to an end face 36 of the side wall 16. Similarly, end fitting 30 comprises an outlet opening 38 for axial flow of a second fluid in the direction of arrow D and an apertured connection flange 40 through which the end fitting 30 is secured to an opposite end face 42 (not shown) of the side wall 16. As shown in FIG. 1, four apertures 44 of the inlet end fitting 28 align with four apertures 46 of the end face 36 and the end fitting 28 is then secured to the end face 36 by threaded fasteners (not shown) or the like.

The core 14 is closely received inside housing 12 and is preferably in contact with the inner surface 18 of the housing 12, although contact between the core 14 and the housing 12 is not essential. The core 14 comprises an outer tube 50 having an outer surface 52 and an inner surface 54 and an inner tube 56 received inside the outer tube 50 and concentric therewith, the inner tube 56 having an outer surface 58 and an inner surface 60.

As shown in the drawings, an annular space 62 is provided between the inner and outer tubes 50, 56. The annular space 62 preferably extends axially throughout the length of the tubes 50, 56 and defines a passageway 64 for axial flow of a fluid through the heat exchanger 10. The core 14 further comprises a corrugated strip fin 66 received in the axial fluid flow passageway 64 to act as a turbulizer for enhancing heat exchange and also to act as a spacer between the inner and outer tubes 50, 56. The strip fin 66 occupies substantially the entire flow passageway 64. It will be appreciated that the provision of strip fin 66 is preferred, but is not an essential feature of the invention. The tubes 50 and 56 may instead be spaced apart by dimples or vanes, as further discussed below in the context of a three-fluid heat exchanger.

The strip fin 66 is formed by rolling and/or stamping a thin sheet or strip of metal. After being cut to the appropriate length (the axial direction) and/or width (the circumferential direction), it is rolled and inserted into the annular space between the tubes. Depending on the dimensions of the sheet or strip from which the strip fin 66 is formed, it may be necessary to insert one or more lengths of strip fin 66 into the annular space 62 so as to occupy substantially the entire flow passageway 64.

The strip fin 66 may preferably have a form as disclosed in U.S. Pat. No. Re. 35,890 (So), which is incorporated herein by reference in its entirety. In the preferred heat exchanger 10, the strip fin 66 is arranged in fluid flow passageway 64 in the "low pressure drop" configuration, that is with corrugations 68 arranged in circumferentially-extending rows 70 and with apertures 78 defined by the corrugations opening in the axial direction. Although less preferred, it will be appreciated that the strip fin may be arranged in the "high pressure drop orientation" (not shown), that is with the rows 70 of corrugations 68 extending axially and with the apertures opening in the circumferential direction.

Each of the corrugations 68 comprises a top portion 72, a bottom portion 74 and a sidewall 76 connecting the top and the bottom portions 72, 74. In the preferred embodiment shown in the drawings, the corrugations 68 have a generally rectangular or trapezoidal shape with the top portions 72, bottom portions 74 and sidewalls 76 being substantially flat. It will be appreciated, however, that the corrugations 68 may instead be rounded or have any other suitable shape. As shown in the drawings, adjacent rows 70 of corrugations 66 are offset relative to one another by about 50 percent in order to maximize heat transfer while minimizing pressure drop.

In preferred heat exchanger 10, the liquid coolant flows axially through the apertures 78 of the strip fin 66. To enhance heat exchange, the inner tube 56 may be expanded to bring the top portions 72 of the corrugations 68 into intimate heat exchange contact with the inner surface 54 of the outer tube 50 and to bring the bottom portions 74 of the corrugations 68 are into intimate heat exchange contact with the outer surface 58 of the inner tube 56. Alternatively, the strip fin 66 may be brazed or bonded to the surfaces 54 and 58 of the outer tube 50 and inner tube 56, respectively. This would achieve intimate thermal contact without necessarily requiring expansion of the inner tube 56.

In order to provide effective heat transfer between the two fluids flowing through heat exchanger 10, at least some of the fluid flowing between the inlet 32 and the outlet 38 must flow through the axial fluid flow passageway 64. In the preferred embodiment shown in the drawings, the end of inner tube 56 closest to the inlet 32 is provided with a metering cap 48 having at least one calibrated opening 49 to permit a controlled portion of the axially-flowing fluid to also flow through the interior 80 of inner tube 56. It will be appreciated that the metering cap 48 could instead be provided at the end of the inner tube 56 closes to the outlet 38. In some preferred embodiments, the calibrated opening (s) 49 may be eliminated so that metering cap 48 completely prevents the fluid from entering the interior 80 of tube 56. Alternatively, the ends of tube 56 may be provided with bypass valves (not shown) which may permit some of the fluid to pass through the interior 80 of inner tube 56 under certain conditions, for example under predetermined conditions of temperature or pressure. Although less preferred in terms of efficiency, it may be desired to leave the ends tube 56 open to permit the fluid to flow freely through the interior 80 of tube 56.

As shown in the drawings, an annular space 82 is also provided between the inner surface 18 of the housing sidewall 16 and the outer surface 52 of outer tube 50. The annular space 82 extends axially throughout the length of the tubes 50, 56 and defines one or more passageways for circumferential flow of a fluid through the annular space 82. Each of the circumferential fluid flow passageways extends circumferentially between the inlet 20 and outlet 22 and axially throughout substantially the entire length of the tubes 50, 56.

In the preferred embodiment of the invention, four circumferential fluid flow passageways 84, 86, 88 and 90 are provided. A radially inner pair of fluid flow passageways 84, 86 extend circumferentially along the outer surface 52 of the outer tube 50 and a radially outer pair of fluid flow passageways 88, 90 extend circumferentially along the inner surface 18 of the housing 16. Thus, the circumferential fluid flow passageways 84, 86, 88 and 90 of preferred heat exchanger 10 are arranged in two layers. As discussed below in more detail, communication between the layers is allowed and encouraged in the heat exchanger of the present invention. It will, however, be appreciated that heat exchangers according to the invention may be constructed with only a single layer of circumferential fluid flow passageways between the outer tube and the housing, or with greater than two layers of circumferential fluid flow passageways between the outer tube and the housing. It will be appreciated that the heights of the strip fin(s) would need to be adjusted to allow the annular space 82 to accommodate more or fewer than two layers.

The circumferential fluid flow passageways 84, 86, 88 and 90 are substantially completely occupied by corrugated strip fins 92, 94, 96 and 98, respectively. As with the strip fin 66 described above, the strip fins 92, 94, 96 and 98 act as turbulizers to enhance heat exchange and also act as spacers between the outer tube 50 and the housing 14. The strip fins 92, 94, 96 and 98 are formed by rolling and/or stamping a thin sheet or strip of metal. After being cut to the appropriate length (the circumferential direction) and/or width (the axial direction), they are inserted into the annular space 82 between the outer tube 50 and the housing 14. Depending on the width of the strip or sheet from which strip fins 92, 94, 96 and 98 are formed, it may be necessary to provide each flow passageway with more than one respective strip fin 92, 94, 96 and 98.

The strip fins 92, 94, 96 and 98 are preferably of identical construction, and therefore the same reference numerals are used to describe the various features of each fin. Furthermore, the strip fins 92, 94, 96 and 98 may have a form as disclosed in the above-mentioned patent to So. In the preferred heat exchanger 10, corrugated strip fins 92, 94, 96 and 98 each comprise a plurality of corrugations 100 arranged in rows 102. Each of the corrugations 100 comprises a top portion 104, a bottom portion 106 and a sidewall 108 connecting the top and the bottom portions 104,106. In the preferred embodiment shown in the drawings, the corrugations 100 have a sinusoidal shape, with smoothly rounded top portions 104 and bottom portions 106. It will be appreciated, however, that the corrugations 100 may be of any suitable shape, including generally triangular, rectangular or trapezoidal, and may preferably have the same shape as the corrugations of strip fin 66. As shown in the drawings, adjacent rows 102 of the corrugated fins 100 are offset relative to one another by about 50 percent.

In the preferred heat exchanger 10, the strip fins 92, 94, 96 and 98 are arranged in circumferential fluid flow passageways 84, 86, 88 and 90 in the "low pressure drop" configuration, that is with the rows 102 of corrugations 100 extending axially and with apertures 110 defined by the corrugations opening in the circumferential direction. It may instead be preferred to arrange strip fins 92, 94, 96 and 98 in the "high pressure drop orientation" (not shown), that is with the rows 102 of corrugations 100 extending circumferentially and with the apertures 110 opening in the axial direction.

Regardless of the orientation of strip fins 92, 94, 96 and 98, the fluid to be cooled, preferably air, flows circumferentially through the circumferential fluid flow passageways 84, 86, 88 and 90 between inlet 20 and outlet 22 of the housing 12.

As seen in the drawings, a radially inner pair of strip fins 92, 94 occupy the radially inner circumferential flow passages 84, 86 and a radially outer pair of strip fins 96, 98 occupy the radially outer circumferential flow passages 88, 90. In the heat exchanger 10 shown in the drawings, a layer of sheet material 112 is sandwiched between inner strip fin 92 and outer strip fin 96 and a layer of sheet material 114 is sandwiched between inner strip fin 94 and outer strip fin 98. The layers of sheet material 112, 114 are preferably substantially co-extensive with strip fins 92, 94, 96 and 98 to prevent "nesting" of the inner and outer strip fins. The layers of sheet material 112, 114 are comprised of a thermally conductive material, preferably sheet metal. More preferably, where the components of the heat exchanger 10 are joined by brazing, the layers of sheet material 112, 114 preferably comprise brazing sheet having an aluminum core and clad on both sides with an aluminum-based brazing alloy which is liquefied to form a filler metal during the brazing operation. The filler metal forms a brazed joint between the sheet material 112, 114 and the inner and outer strip fins 92, 94, 96 and 98, providing intimate contact and optimum heat exchange. It is also preferred that the inner strip fins 92 and 94 are brazed to the outer surface 52 of outer tube 50 to further enhance heat exchange.

Figure 5:
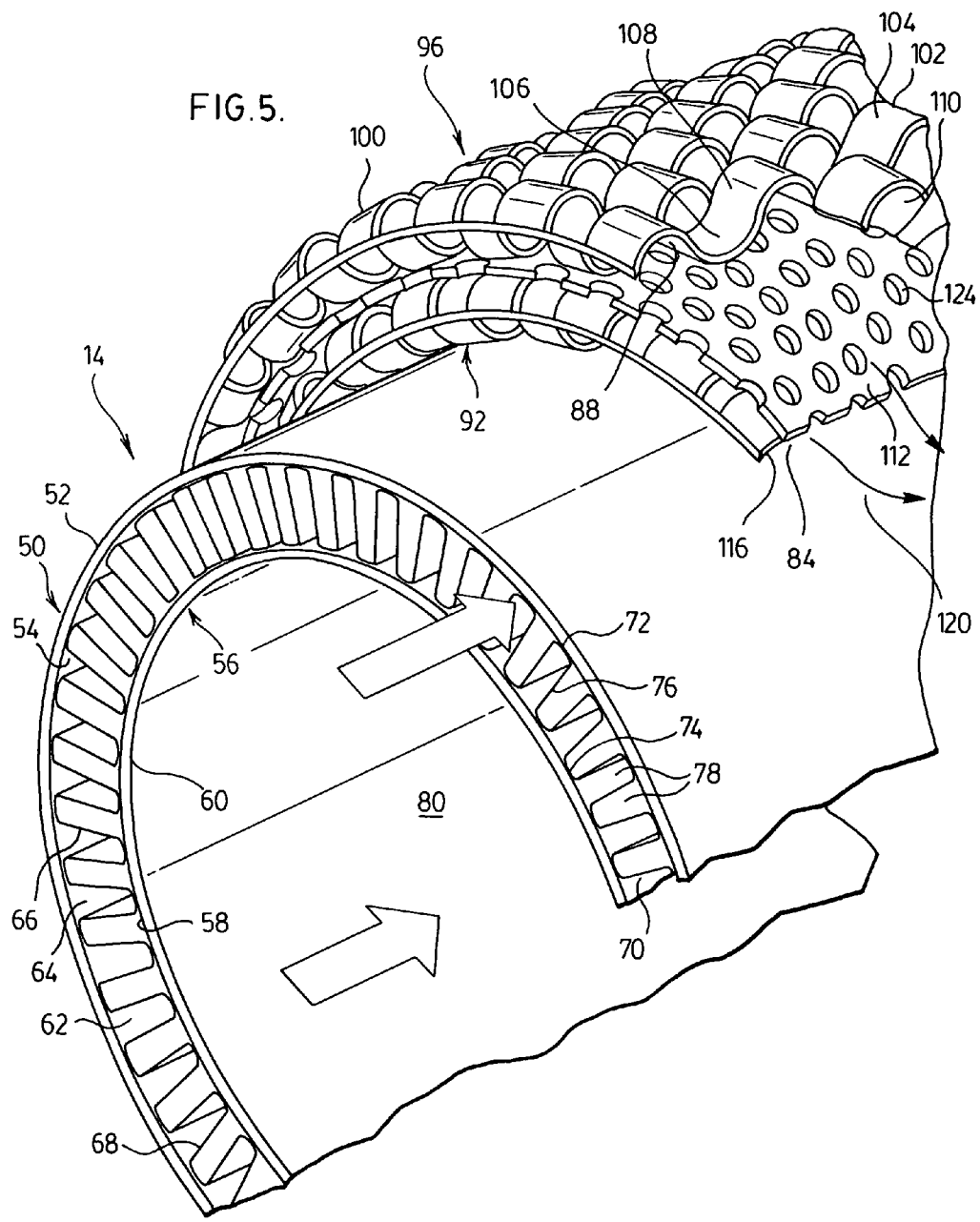
FIG. 5 is an isolated, partly cut-away view of the core of the heat exchanger of FIG. 1.

The layers of sheet material 112,114 between adjacent layers of strip fins 92, 94, 96 and 98 may preferably be constructed so as to permit flow communication between the outer flow passageways 88, 90 and the inner flow passageways 84, 86. For this purpose, the layers of sheet material 112, 114 may be provided with perforations 124 as illustrated in FIG. 5. It will be appreciated that these perforations need not be of regular shape or have the same appearance as perforations 124, so long as they prevent nesting of the outer strip fins 96, 98 with the inner strip fins 92, 94 and permit flow communication between the inner flow passageways 84, 86 and outer flow passageways 88, 90. It will also be appreciated that the perforations 124 and sheets 112, 114 may become somewhat distorted during brazing. In other preferred embodiments, the sheet material 112, 114 may for example comprise a metal mesh or may comprise a thin, unperforated sheet which becomes deformed by partial melting during the brazing operation to effectively form perforations between the layers. In yet other preferred embodiments, the sheet material 112, 114 may comprise sacrificial inserts which separate the two layers of strip fin during assembly, but then melt and partially or completely disappear during brazing. This type of sheet material 112, 114 would preferably be made solely of braze filler metal which would normally melt completely to form braze fillets between the strip fin layers.

As seen in the drawings, each of the corrugated strip fins 92, 94, 96 and 98 has a pair of circumferentially spaced edges 116, 118, one of the edges 116 being located proximate the inlet manifold 24 and the other of the edges 118 being located proximate the outlet manifold 26. The edges 116 of the inner strip fins 92, 94, located proximate the inlet manifold 24, are spaced from one another, as are the edges 116 of the outer strip fins 96, 98. The spaces between edges 116 form an open channel 120 extending axially along substantially the entire length of tube 50, preferably having a width in the circumferential direction substantially the same as the width of manifolds 24, 26, and having a height equal to the radial distance between the outer surface 52 of outer tube 50 and the inner surface 18 of the housing sidewall 16. The opposite edges 118 of strip fins 92, 94, 96 and 98 are similarly spaced to form a channel 122 of similar dimensions at the outlet manifold 26.

The provision of channels 120,122 ensures that the ends of the circumferential flow channels 84, 86, 88, 90 are in communication with the housing inlet 20 and outlet 22, thereby ensuring an efficient distribution of the fluid to be cooled into the circumferential flow passageways 84, 86, 88 and 90.

In the preferred heat exchanger 10, the edges 116 and 118 of the strip fins 92, 94, 96, 98, the channels 120,122 and the manifolds 24, 26 extend along substantially the entire length of the heat exchanger. However, it will be appreciated that this is not a necessary feature of the present invention. For example, the manifolds 24, 26 and channels 120, 122 may be provided only in the regions of the housing inlet 20 and outlet 22, with other parts of the annular space 82 being completely filled with corrugated strip fins having the structure of fins 92, 94, 96, 98 described above. An example of this type of structure is described below in connection with FIG. 6. Where the strip fins are arranged in the high pressure drop orientation, an efficient axial flow distribution can be achieved along the length of the heat exchanger since the fluid will tend to flow axially through the apertures 110 in the corrugations 100.

In the preferred heat exchanger 10, where the inlet and outlet 20, 22 and the respective manifolds 24, 26 are spaced from one another by about 180 degrees, the flow of fluid, preferably air, entering the annular space 82 through the inlet 20 is split in two directions. One portion of the fluid flows through flow passages 84, 88 around one side of the outer tube 50, another portion of the fluid flows through flow passages 86, 90 around the opposite side of tube 50, and both portions converge at the outlet manifold 26 to flow out through the outlet 22.

Figure 6:
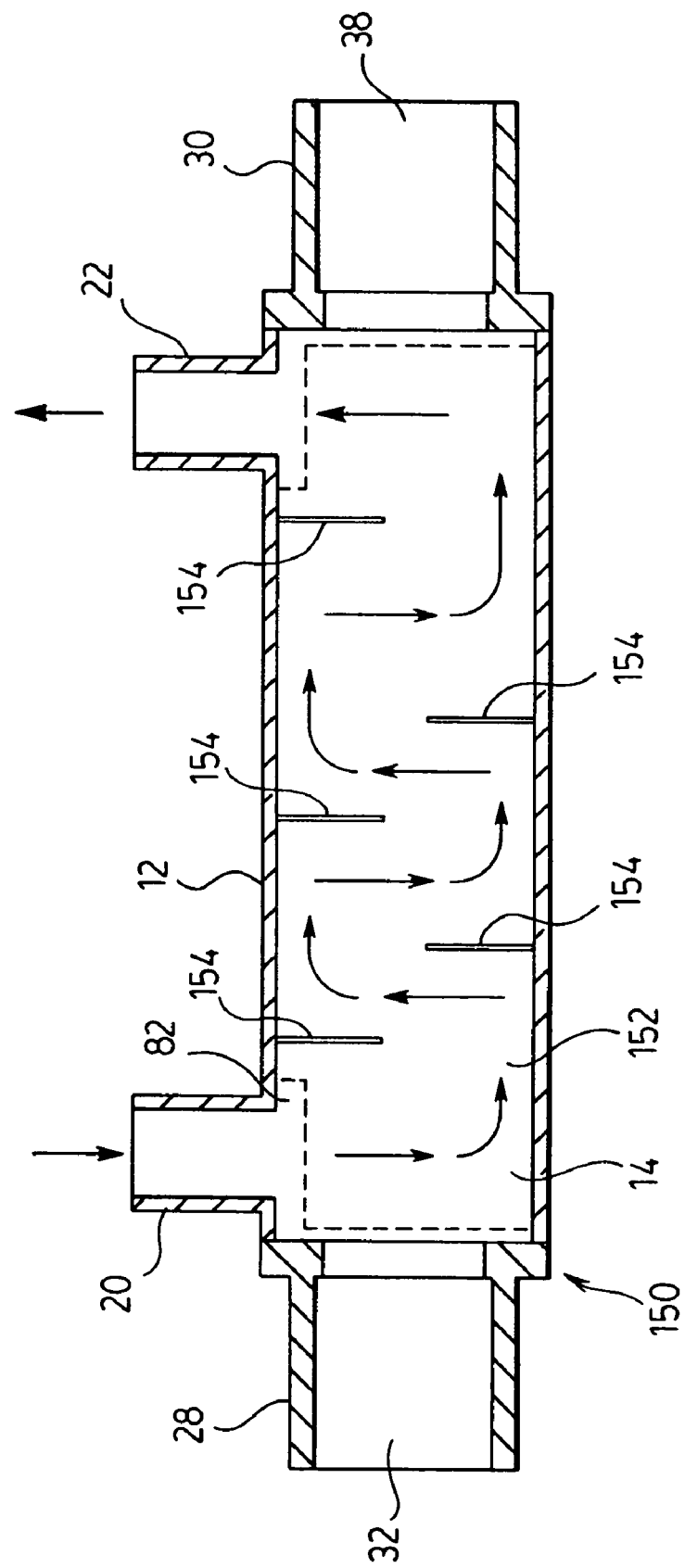
FIG. 6 is a side view, partly in cross-section, showing a heat exchanger according to a second preferred embodiment of the invention.

Although the circumferential spacing between the inlet 20 and outlet 22 in preferred heat exchanger 10 is about 180 degrees, it will be appreciated that this circumferential spacing is variable and depends on the desired shape and configuration of the heat exchanger. Furthermore, it will be appreciated that the housing inlet 20 and outlet 22 may be axially spaced relative to one another as shown in FIG. 6. In this type of heat exchanger 150, means may be provided for causing the fluid to be cooled to travel along a path having axial and circumferential components, eg. a spiral or sinusoidal path. In the preferred heat exchanger 150 of FIG. 6, the inlet 20 and outlet 22 are located proximate opposite ends of the tubes (not shown), with substantially the entire area of annular space 82 between the core 14 and housing 12 being filled by corrugated strip fin(s) 152 (shown in outline only by dotted lines) arranged in one or more layers. The annular space 82 is also provided with circumferential flow guides 154, schematically shown in FIG. 6, which cause circumferential flow of the fluid to be cooled. Flow guides may preferably comprise crimps or other deformation of the strip fins, or radial baffles. These are further described below. The flow guides 154 direct flow of the fluid to be cooled in the direction of the arrows in FIG. 6, causing the fluid to make a number of circumferential passes as it flows axially between the inlet and the outlet.

The deformation of strip fins by crimping and the like is disclosed in U.S. Pat. No. 6,199,626 (Wu et al.) issued on Mar. 13, 2001; U.S. Pat. No. 6,244,334 (Wu et al.) issued on Jun. 12, 2001; U.S. Pat. No. 6,340,053 (Wu et al.) issued on Jan. 22, 2002; and U.S. Pat. No. 6,273,183 (So et al.) issued on Aug. 14, 2001. These documents are incorporated herein in their entirety.

Figure 7:
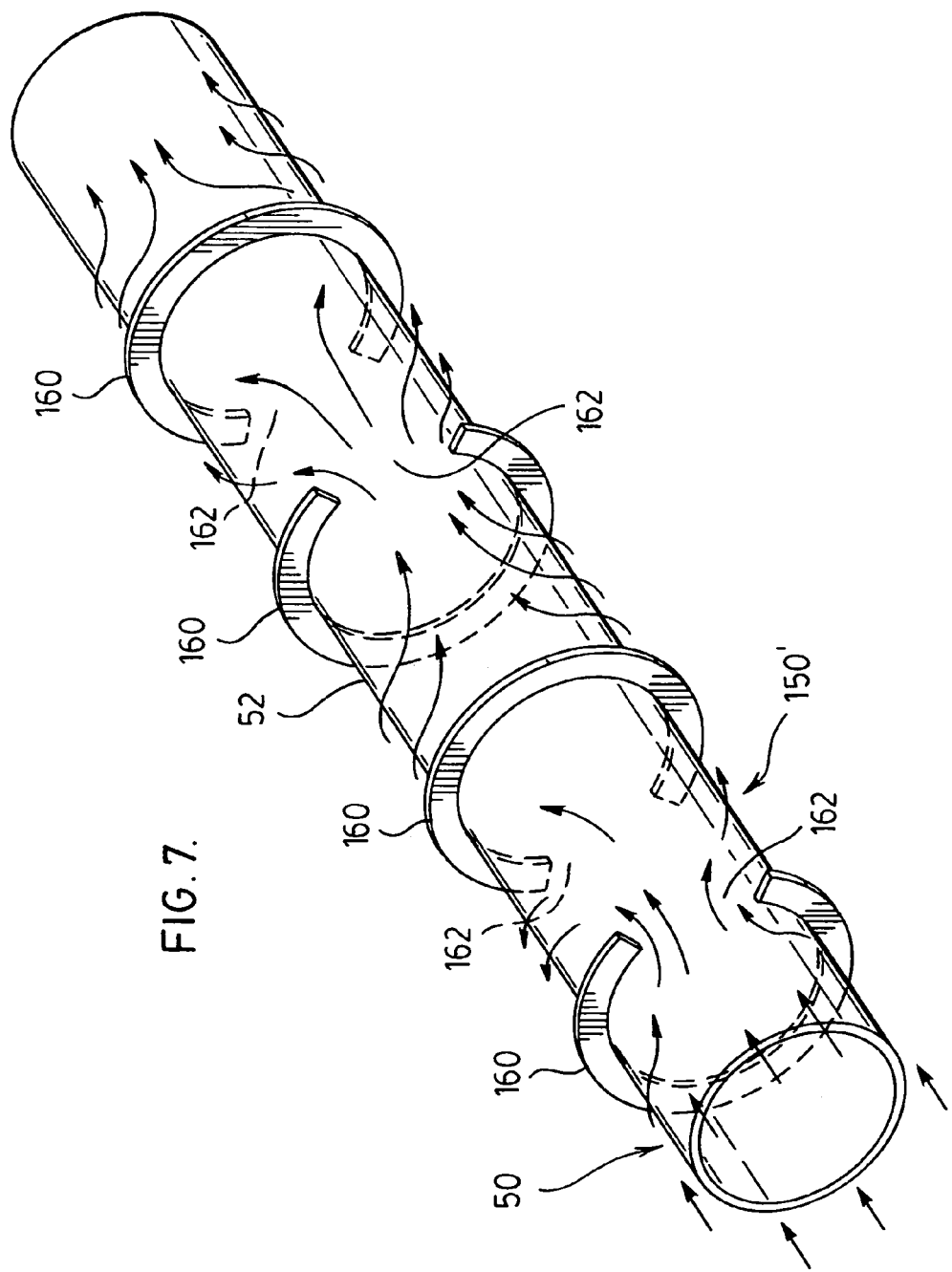
FIG. 7 is a perspective view of the outer tube and a plurality of baffle plates of a preferred form of the heat exchanger shown in FIG. 6.

FIG. 7 illustrates a heat exchanger 150', comprising a preferred form of heat exchanger 150, in which the flow guides comprise C-shaped baffle plates 160. For simplicity, FIG. 7 shows only the outer tube 50 and the C-shaped baffle plates 160 of heat exchanger 150'. Subject to the following discussion, it will be appreciated that the core of heat exchanger 150' preferably also includes the additional components of heat exchanger core 14 described above. The housing (not shown) of heat exchanger 150' is preferably similar to that shown in FIG. 6 in which the inlet 20 and outlet 22 are axially spaced from one another.

As shown in FIG. 7, a plurality of axially spaced baffle plates 160 are provided along the outer tube 50. The baffle plates 160 have an inner circumference which is slightly larger than the outer circumference of outer tube 50 so as to be closely fitted to the outer surface 52 of outer tube 50. The baffle plates 160 have a height (difference between inner and outer circumference) which is substantially the same as the height of the annular space 82 (not shown) between the core and the housing. As mentioned above, the baffle plates are C-shaped, having a gap 162 of about 90 degrees between the opposite ends of the C. The fluid flowing through the annular space 82 is forced to flow through these gaps 162, as shown by the curved arrows in FIG. 7. Arranging adjacent baffle plates 160 with their gaps offset, preferably by about 180 degrees, results in circumferential flow of the fluid as it moves axially along the outer tube 50. Although not shown in FIG. 7, sections of strip fin arranged in at least one layer would preferably be wrapped completely around the outer tube 50 between adjacent baffle plates, thereby enhancing heat exchange with the fluid flowing between the tubes. The strip fin on the outer surface 52 of tube 50 may be arranged in either the high or low pressure drop orientation.

Although the preferred heat exchanger shown and described herein comprises cylindrical tubes 50, 56 and a housing 12 with a cylindrical side wall 16, it will be appreciated that the tubes 50, 56 and housing 12 may be of other suitable shapes. For example, the tubes 50, 56 and housing 12 may have the same or different cross-sectional shape selected from rounded shapes and multi-sided shapes. Preferred rounded shapes include circular, oval, elliptical, etc. and preferred multi-sided shapes include regular or irregular polygons such as square, rectangular, pentagonal, hexagonal, etc. The annular spaces within and between the tubes 50,56 and between outer tube 50 and housing 12 would of course take on shapes which are dictated by the shapes of the tubes 50, 56 and housing 12.

Although the preferred heat exchanger shown and described herein is configured for heat transfer between two fluids, it will be appreciated that heat exchangers according to the invention may also be configured for heat transfer between three fluids. In such a heat exchanger, a first fluid flows through the interior 80 of inner tube 56, a second fluid flows through the axial flow passageway 64 between the outer tube 50 and the inner tube 56, and a third fluid flows through the annular space 82 between the housing 12 and the core 14. In one preferred example of such a heat exchanger, the first fluid is power steering fluid or another gear oil such as transmission fluid or hydraulic fluid, the second fluid is engine coolant, and the third fluid is engine oil. The coolant (second fluid) removes heat from both the first fluid and the third fluid under most vehicle operating conditions. In addition, the coolant may heat the first fluid and the third fluid under cold start conditions and/or modulate oil temperature together with suitable bypass valves or auxiliary cooling loops.

Providing the interior 80 of inner tube 56 with a form of turbulizer or, for example an open-celled foam comprised of aluminum or other conductive material, can augment heat exchange between the first and second fluids. Some type of augmentation is particularly important when using a viscous liquid as the first fluid. In the case of a conductive foam, a radial gradiant in cell size, with the cell opening size increasing toward the periphery of the foam insert, is most preferred as it optimizes heat exchange with the second fluid.

Alternatively, an additional inner tube, known as a "dead tube" can be inserted into the interior 80 of inner tube 56 and concentric with the inner tube 56. The dead tube is preferably closed at one or both ends, and is preferably spaced from the inner tube by a layer of turbulizer, eg. a strip fin such as fin 66 described above, or other spacing means such as dimples. The dead tube forces the first fluid to flow through the resulting annulus between the dead tube and the inner surface 60 of inner tube 56. This increases the velocity of the first fluid and improves heat transfer. In another alternative construction, a vaned insert may be provided which causes the first fluid to be swirled out against the inner surface 60 of the inner tube 56, also improving heat transfer.

Furthermore, where the second fluid in the three-fluid heat exchanger is engine coolant, a turbulized augmentation between tubes 50 and 56, as provided by strip fin 66, is less critical and could be replaced by a dimple construction, for example.

Lastly, it will be appreciated that a three-fluid heat exchanger would require more complex end fittings than fittings 28, 30 since it would require separate inlets and outlets for both the first and second fluids. It will also be appreciated that the three fluid streams flowing through the heat exchanger are not necessarily comprised of three different fluids. For example, the first fluid and the third fluid may be the same or the first fluid and the second fluid may be the same.

Figure 8:
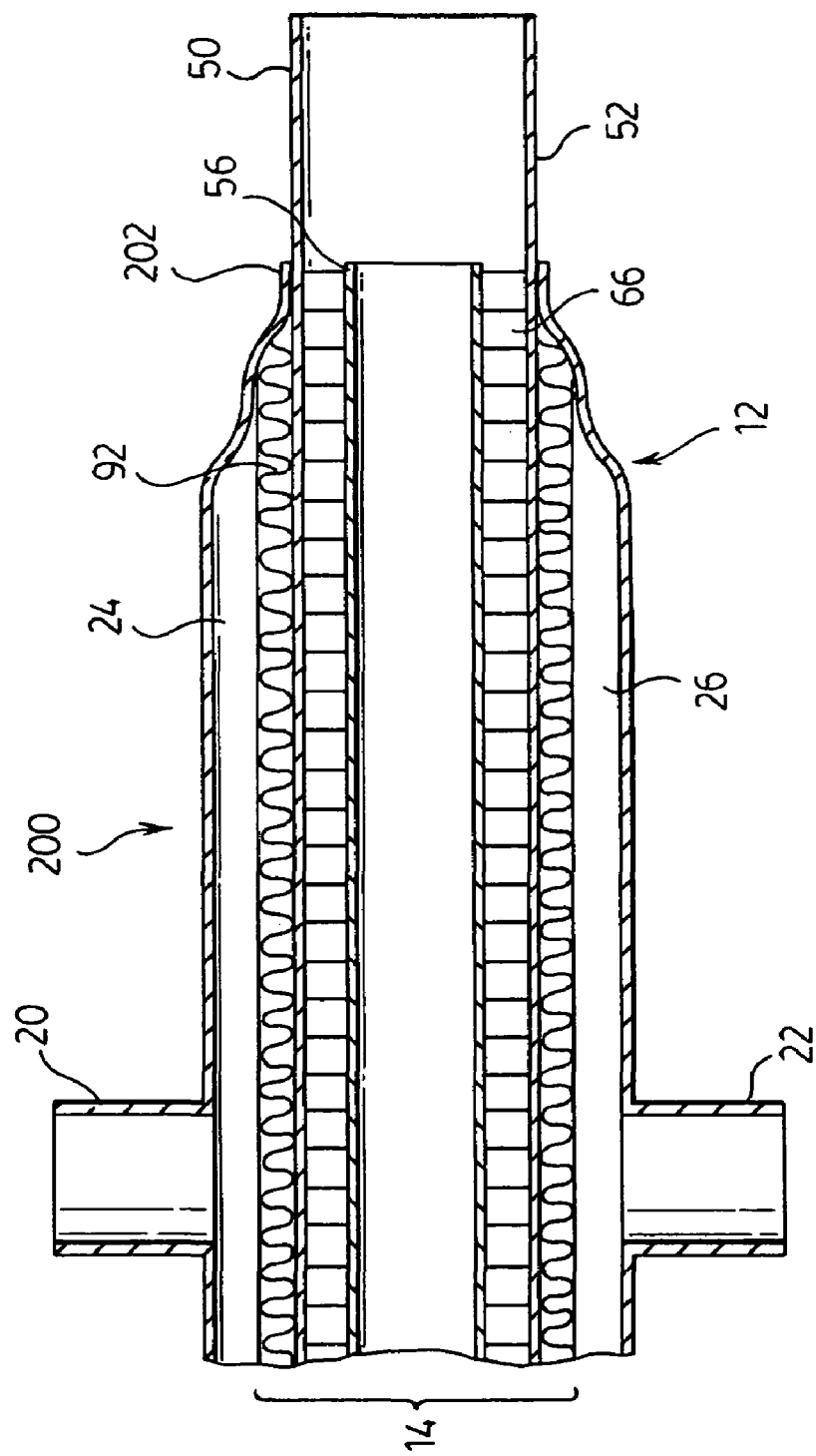
FIG. 8 is a cross-sectional side view showing one end of a third preferred heat exchanger according to the invention.

FIG. 8 illustrates a further preferred heat exchanger 200 according to the invention. In heat exchanger 200, the housing 12 is of tubular construction, with the inlet and outlet manifold 24 and 26 being formed as outwardly protruding ribs which terminate near the ends of the housing 12. According to this embodiment, the outer tube 50 is made longer than both the inner tube 56 and the housing 12. During assembly, the ends 202 (only one of which is shown) of the housing 12 are deformed so as to contact the outer surface 52 of the outer tube 50, and preferably sealed to the outer tube by brazing or bonding. Rather than end forming as shown in the drawings, it will be appreciated that similar sealing of the space between the outer tube 50 and the end of the housing 12 could be achieved by an annular end cap (not shown). The inner periphery of the end cap would seal against the outer tube and the outer periphery would seal to the end of the housing 12.

Figure 9:
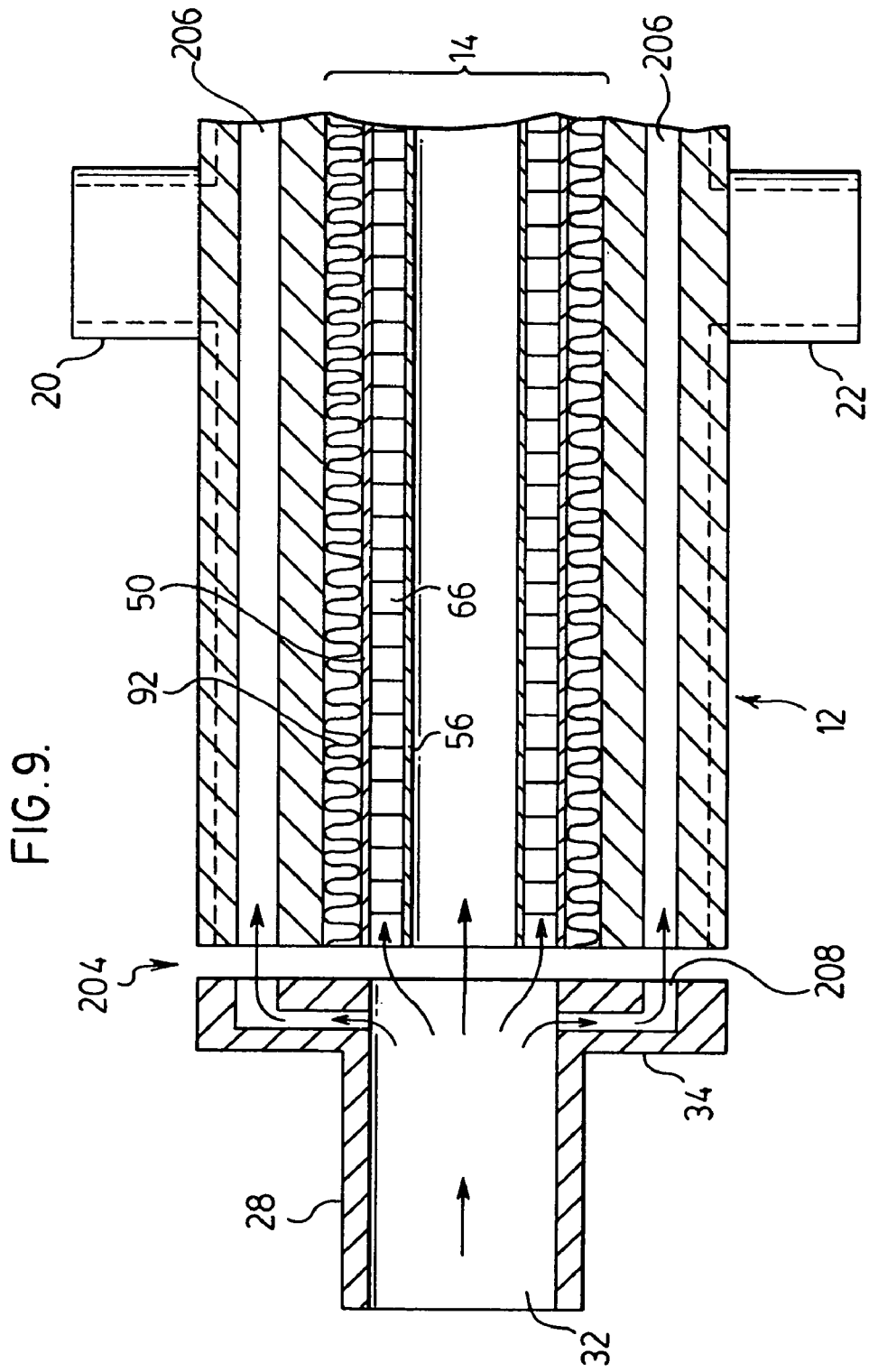
FIG. 9 is a cross-sectional side view showing one end of a fourth preferred heat exchanger according to the invention.

FIG. 9 illustrates a fourth preferred heat exchanger 204 according to the invention in which additional cooling is provided by forming one or more cooling channels 206 in the housing 12. Two such channels 206 are illustrated in the embodiment of FIG. 9. The view of FIG. 9 can best be understood by first referring to FIG. 1, and in particular the apertures 44 in the end fitting 28 and the corresponding apertures 46 in the housing. The cooling channels 206 in FIG. 9 can be seen as corresponding to apertures 46 except that they extend through the housing 12 from one end to the other. Similarly, the apertures 44 of FIG. 1 can be viewed as corresponding to the coolant passages 208 extending from the coolant inlet 32 of fitting 28 to the sealing face 210 of the fitting 28. Furthermore, it is to be noted that the cross-section of FIG. 9 does not bisect the heat exchanger 204, but rather extends through a plane which, explained with reference to FIG. 1, extends through an aperture 44 located on the inlet (20) side of the housing 12 and a directly opposed aperture 44 located on the outlet (22) side of the housing 12.

In the heat exchanger 204, a major part of the coolant flow through the inlet 32 enters the inner tube 56 and the annular space between the inner and outer tubes 56, 50 as described above in connection with heat exchanger 10. A minor part of the coolant flow through the inlet 32 flows through coolant passages 208 and enters cooling channels 206, through which it flows to the other end of the heat exchanger. Preferably, an identical fitting 30 is provided at the other end of the housing which directs the coolant from channels 206 to the outlet 38 (not shown). In this way, the flange 34 of fitting 28 acts as a bridge to transport the coolant across the air channels to the housing 12. The fitting 28, shown in FIG. 9 as being separated from housing 12, is preferably sealed thereto either by mechanical fasteners (not shown) or by brazing.

Although the invention has been described in connection with certain preferred embodiments, it is not limited thereto. Rather, the invention includes within its scope all embodiments which may fall within the scope of the following claims.

What is claimed is:

1. A heat exchanger comprising:
   (a) an outer tube having an outer surface;
   (b) an inner tube received inside the outer tube and concentric therewith, wherein an axial fluid flow passageway is formed between the inner and outer tubes;
   (c) a first inlet and a first outlet in fluid communication with the axial passageway, the first inlet and the first outlet being axially spaced from one another;
   (d) at least one circumferential fluid flow passageway being formed along the outer surface of the outer tube; and
   (e) a corrugated strip fin being arranged in each of said at least one circumferential fluid flow passageways, each of said strip fins comprising a plurality of rows of corrugations, the corrugations each comprising a top portion, a bottom portion and a side wall connecting the top and bottom portions, the bottom portions of at least some of the corrugations being in contact with the outer tube;
   wherein the corrugated strip fins are arranged in the circumferential fluid flow passageways in a low pressure drop orientation with rows of corrugations in the corrugated strip fins extending axially through the circumferential flow passageways and with apertures through the corrugations extending circumferentially.

2. The heat exchanger of claim 1, wherein each of said strip fins extends between a second inlet and a second outlet of the heat exchanger.

3. The heat exchanger of claim 1, further comprising:
   (f) a housing comprising a sidewall having an inner surface, the sidewall surrounding the outer tube with an annular space being formed between the inner surface of the sidewall and the outer surface of the outer tube, the housing further comprising a second inlet and a second outlet extending through the sidewall, the second inlet and the second outlet being circumferentially spaced from one another;
   wherein the at least one circumferential fluid flow passageway is provided in the annular space between the housing and the outer tube, the at least one circumferential fluid flow passageway extending between the second inlet and the second outlet; and
   wherein the corrugated strip fin of each circumferential fluid flow passageway extends between the second inlet and the second outlet.

4. The heat exchanger of claim 2, wherein each of the corrugated strip fins has a pair of circumferentially spaced edges, one of the edges being located at the second inlet and one of the edges being located at the second outlet; and wherein the apertures of the corrugations along each of the edges are completely open to either the second inlet or the second outlet.

5. The heat exchanger of claim 2, wherein the outer surface of the outer tube is in direct communication with the second inlet and the second outlet.

6. The heat exchanger of claim 2, wherein the second inlet and the second outlet are circumferentially spaced from one another by about 180 degrees, so as to form first and second circumferential flow passageways between the inlet and the outlet, the first and second flow passageways diverging from the inlet, extending around opposite sides of the outer tube, and converging at the outlet.

7. The heat exchanger of claim 6, wherein the first and second flow passageways are each provided with one of said corrugated strip fins, each of the strip fins having a pair of circumferentially spaced edges, one of the edges being located at the second inlet and one of the edges being located at the second outlet; wherein the edges of one strip fin are circumferentially spaced from the edges of the other strip fin so as to form gaps between the strip fins at the second inlet and the second outlet, the outer tube being in direct communication with the second inlet and the second outlet at said gaps.

8. The heat exchanger of claim 7, wherein the gaps extend axially along at least part of the length of the outer tube.

9. The heat exchanger of claim 3, wherein the top portions of at least some of the corrugations are in contact with the inner surface of the housing.

10. The heat exchanger of claim 1, including at least one radially inner circumferential flow passageway having one said corrugated strip fin and at least one radially outer circumferential flow passageway having one said corrugated strip fin, the corrugated strip fins in said inner and outer flow passageways being in thermal contact with one another.

11. The heat exchanger of claim 10, wherein flow communication is provided between the inner and outer flow passageways.

12. The heat exchanger of claim 11, wherein flow communication between the inner and outer flow passageways is provided by a layer of thermally conductive, perforated sheet material.

13. The heat exchanger of claim 12, wherein the thermally conductive sheet material comprises a layer of perforated sheet metal which is in contact with the bottom portions of at least some of the corrugations of the corrugated strip fin in said outer flow passageway and with the top portions of at least some of the corrugations of the corrugated strip fin in said inner flow passageway.

14. The heat exchanger of claim 13, wherein an area of the sheet metal is substantially coextensive with the corrugated strip fins.

15. The heat exchanger of claim 1, wherein an interior of the inner tube is partially blocked, thereby limiting fluid flow through the inner tube.

16. The heat exchanger of claim 15, wherein the inner tube is partially blocked by a metering cap provided at an end of the inner tube, the metering cap having at least one aperture to permit flow of fluid through the inner tube.

17. The heat exchanger of claim 2, wherein the second inlet and the second outlet are axially spaced from one another.

18. The heat exchanger of claim 1, further comprising flow guides to direct fluid flow through the circumferential fluid flow passageways.

19. The heat exchanger of claim 18, wherein the flow guides are selected from the group consisting of radially-extending baffle plates and crimps or other deformations in the strip fins which restrict axial fluid flow.

20. The heat exchanger of claim 3, wherein the axial fluid flow passageway is for flow of a liquid coolant and wherein the housing is provided with at least one coolant channel for flow of the liquid coolant.

21. The heat exchanger of claim 20, wherein the first inlet and the first outlet are provided in respective inlet and outlet fittings attached to opposite ends of the housing, wherein the at least one cooling channel extends axially between the opposite ends of the housing, and wherein the inlet fitting includes at least one side channel, each of which is in communication with the first inlet and with an end of one of the cooling channels of the housing.

22. The heat exchanger of claim 21, wherein the side channels extend radially outwardly from the inlet to the cooling channels of the housing.

23. A core for a heat exchanger, the core comprising:
(a) an outer tube having an outer surface;
(b) an inner tube received inside the outer tube and concentric therewith, wherein an axial fluid flow passageway is formed between the inner and outer tubes;
(c) a first inlet and a first outlet in fluid communication with the axial passageway, the first inlet and the first outlet being axially spaced from one another;
(d) at least one circumferential fluid flow passageway being formed along the outer surface of the outer tube; and
(e) a corrugated strip fin being arranged in each of said at least one circumferential fluid flow passageways, each of said strip fins comprising a plurality of rows of corrugations, the corrugations each comprising a top portion, a bottom portion and a side wall connecting the top and bottom portions, the bottom portions of at least some of the corrugations being in contact with the outer tube;
wherein the corrugated strip fins are arranged in the circumferential fluid flow passageways in a low pressure drop orientation with rows of corrugations in the corrugated strip fins extending axially through the circumferential flow passageways and with apertures through the corrugations extending circumferentially.

24. The heat exchanger of claim 3,
wherein the heat exchanger includes at least one radially inner circumferential flow passageway having one said corrugated strip fin and at least one radially outer circumferential flow passageway having one said corrugated strip fin, the corrugated strip fins in said inner and outer flow passageways being in thermal contact with one another.

25. The heat exchanger of claim 24, wherein flow communication is provided between the inner and outer flow passageways.

26. A heat exchanger comprising:
(a) an outer tube having an outer surface;
(b) an inner tube received inside the outer tube and concentric therewith, wherein an axial fluid flow passageway is formed between the inner and outer tubes;
(c) a first inlet and a first outlet in fluid communication with the axial passageway, the first inlet and the first outlet being axially spaced from one another;
(d) at least one circumferential fluid flow passageway being formed along the outer surface of the outer tube; and
(e) a corrugated strip fin being arranged in each of said at least one circumferential fluid flow passageways, each of said strip fins comprising a plurality of rows of corrugations, the corrugations each comprising a top portion, a bottom portion and a side wall connecting the top and bottom portions, the bottom portions of at least some of the corrugations being in contact with the outer tube;
(f) a housing comprising a sidewall having an inner surface, the sidewall surrounding the outer tube with an annular space being formed between the inner surface of the sidewall and the outer surface of the outer tube, the housing further comprising a second inlet and a second outlet extending through the sidewall, the second inlet and the second outlet being circumferentially spaced from one another;

wherein the at least one circumferential fluid flow passageway is provided in the annular space between the housing and the outer tube, the at least one circumferential fluid flow passageway extending between the second inlet and the second outlet;

wherein the corrugated strip fin of each circumferential fluid flow passageway extends between the second inlet and the second outlet;

wherein the heat exchanger includes at least one radially inner circumferential flow passageway having one said corrugated strip fin and at least one radially outer circumferential flow passageway having one said corrugated strip fin, the corrugated strip fins in said inner and outer flow passageways being in thermal contact with one another;

wherein flow communication is provided between the inner and outer flow passageways; and wherein flow communication between the inner and outer flow passageways is provided by a layer of thermally conductive, perforated sheet material.

27. The heat exchanger of claim 26, wherein the thermally conductive sheet material comprises a layer of perforated sheet metal which is in contact with the bottom portions of at least some of the corrugations of the corrugated strip fin in said outer flow passageway and with the top portions of at least some of the corrugations of the corrugated strip fin in said inner flow passageway.

28. The heat exchanger of claim 27, wherein an area of the sheet metal is substantially coextensive with the corrugated strip fins.

29. A heat exchanger comprising:
(a) an outer tube having an outer surface;
(b) an inner tube received inside the outer tube and concentric therewith, wherein an axial fluid flow passageway is formed between the inner and outer tubes;
(c) a first inlet and a first outlet in fluid communication with the axial passageway, the first inlet and the first outlet being axially spaced from one another;
(d) at least one circumferential fluid flow passageway being formed along the outer surface of the outer tube; and
(e) a corrugated strip fin being arranged in each of said at least one circumferential fluid flow passageways, each of said strip fins comprising a plurality of rows of corrugations, the corrugations each comprising a top portion, a bottom portion and a side wall connecting the top and bottom portions, the bottom portions of at least some of the corrugations being in contact with the outer tube;

wherein the heat exchanger includes at least one radially inner circumferential flow passageway having one said corrugated strip fin and at least one radially outer circumferential flow passageway having one said corrugated strip fin, the corrugated strip fins in said inner and outer flow passageways being in thermal contact with one another;

wherein flow communication is provided between the inner and outer flow passageways; and wherein said flow communication between the inner and outer flow passageways is provided by a layer of thermally conductive, perforated sheet material.

30. The heat exchanger of claim 29, wherein the thermally conductive sheet material comprises a layer of perforated sheet metal which is in contact with the bottom portions of at least some of the corrugations of the corrugated strip fin in said outer flow passageway and with the top portions of at least some of the corrugations of the corrugated strip fin in said inner flow passageway.

31. The heat exchanger of claim 30, wherein an area of the sheet metal is substantially coextensive with the corrugated strip fins.

* * * * *